United States Patent [19]

Rucha et al.

[11] 4,255,463

[45] Mar. 10, 1981

[54] METHOD OF DEPOSITION OF SILICON IN FINE CRYSTALLINE FORM

[75] Inventors: Ulrich Rucha, Neufahrn; Wolfgang Dietze, Munich, both of Fed. Rep. of Germany

[73] Assignee: Siemens Aktiengesellschaft, Berlin and Munich, Fed. Rep. of Germany

[21] Appl. No.: 58,455

[22] Filed: Jul. 18, 1979

[30] Foreign Application Priority Data

Jul. 19, 1978 [DE] Fed. Rep. of Germany ....... 2831819

[51] Int. Cl.$^3$ ............................................. C01B 33/02
[52] U.S. Cl. .................................... 427/51; 423/349; 423/350; 427/86
[58] Field of Search ................. 423/349, 350; 427/86, 427/51

[56] References Cited

U.S. PATENT DOCUMENTS

| | | | |
|---|---|---|---|
| 3,120,451 | 2/1964 | Schmidt et al. | 423/349 X |
| 3,496,037 | 2/1970 | Jackson et al. | 423/349 X |
| 4,087,571 | 5/1978 | Kamins et al. | 427/86 |

*Primary Examiner*—Jack Cooper
*Attorney, Agent, or Firm*—Herbert L. Lerner

[57] ABSTRACT

Method of deposition of silicon in fine crystalline form upon a substrate from a silicon-containing reaction gas which includes, at a set mole ratio of the reaction gas and throughput selected for the deposition process, setting the deposition rate-determining temperature of the substrate, at the beginning of deposition, at a temperature lower than optimal temperature for deposition of silicon thereon, maintaining the lower than optimal temperature during a first deposition phase, thereafter raising the temperature of the substrate to the optimal temperature while maintaining the other parameters determining the rate of deposition, and maintaining the optimal temperature for the remainder of the deposition.

4 Claims, 1 Drawing Figure

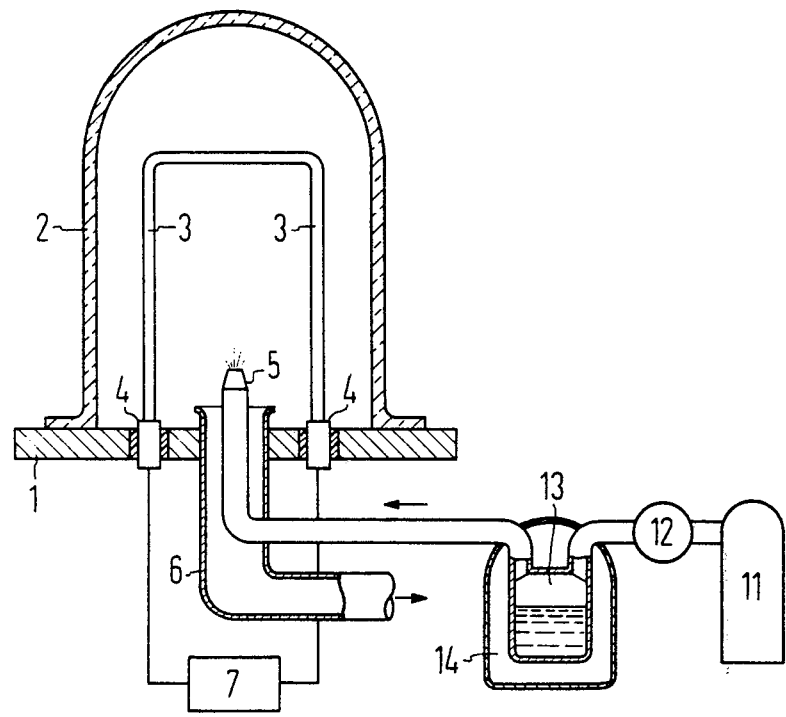

METHOD OF DEPOSITION OF SILICON IN FINE CRYSTALLINE FORM

The invention relates to a method of depositing silicon in fine crystalline form, more particularly, on a substrate preferably heated by direct passage of current therethrough, from an appropriate reaction gas especially formed of a silicon-halogen compound and hydrogen.

It has been known heretofore, in methods of deposition from the gaseous phase, to vary the parameters determining the deposition at the beginning or also during the deposition or precipitation process. It is furthermore known from U.S. Pat. No. 3,120,451 corresponding to German Pat. No. 1,123,300 to operate, at the beginning of the deposition or precipitation process, with a lower throughput or flow rate of the flowing gas mixture, and gradually to increase the throughput or flow rate. The objective of this measure is to increase the purity of the silicon by preventing undesired boron precipitation or deposition.

As is well known, boron has a disadvantageous property or characteristic of being unable to be displaced appreciably during zone melting because the distribution coefficient thereof is nearly at 1, and of vaporizing into the vacuum only in very small quantities. Consequently, an effort is made to permit as little boron as possible to penetrate into the semiconductor material during the production thereof. The precipitation or deposition of boron is therefore prevented by operating with a smaller throughput or flow rate of the reaction gas mixture at the beginning of the precipitation or deposition process and, then, gradually increasing the throughput or flow rate.

The invention of the instant application, on the other hand, is based on a different effect. It has been found that during the production of polycrystalline silicon rods, a coarse crystalline growth occurs, at times, leading to the occurence of considerable crystal lattice faults during subsequent production of monocrystalline rods from these polyrods in a crucible-free floating zone melting process.

For this purpose, it has been proposed heretofore in German Published Non-Prosecuted Patent Application DE-OS No. 27 27 305 to decrease or increase the mole ratio in the reaction gas as well as the precipitation or deposition temperature and the gas throughput or flow rate starting with a high mole ratio, a high gas throughput or flow rate and optimal precipitation or deposition temperature during the precipitation or deposition in accordance with a predetermined program.

In such a method, the mole ratio is advantageously set at 0.5 at the beginning of the precipitation or deposition and the optimal precipitation or deposition temperature to 1100° C. whereas, during the precipitation or deposition, a gas throughput or flow rate ranging from 3,000 to 15,000 liters per hour (1/h) is used. The gas throughput or flow rate, as is generally known, is the quantity of reaction gas flowing along the heated substrate per unit time. According to one exemplifying embodiment of the invention in this application, the mole ratio is lowered to 0.2 after precipitation or deposition for about 10 minutes at a high mole ratio.

It is accordingly an object of the invention to provide a method of deposition of silicon in fine crystalline form which avoids the disadvantages of the heretofore known as well as the heretofore proposed methods of this general type mentioned hereinbefore.

With the foregoing and other objects in view, there is provided, in accordance with the invention, a method of deposition of silicon in fine crystalline form upon a substrate from a silicon-containing reaction gas which comprises, at a set mole ratio of the reaction gas and throughput selected for the deposition process, setting the deposition rate-determining temperature of the substrate at a temperature lower than optimal temperature for deposition of silicon thereon, maintaining the lower than optimal temperature during a first deposition phase, thereafter raising the temperature of the substrate to the optimal temperature while maintaining the other parameters determining the rate of deposition, and maintaining the optimal temperature for the remainder of the deposition.

In accordance with another mode of the method invention, the optimal deposition temperature is about 1100° C.

In accordance with a further mode of the method invention, the substrate temperature is below 1050° C. during the first deposition phase.

In accordance with a more specific mode of the method invention, the substrate temperature is about 1000° C.

In accordance with an added mode of the method invention, the time interval of the first deposition phase is at most two hours.

In accordance with an additional mode of the invention, the method comprises increasing the throughput of the reaction gas after increasing the deposition temperature to the optimal temperature.

In accordance with yet another mode of the method invention, the reaction gas is formed of a silicon-halogen compound and hydrogen.

In accordance with a concomitant mode of the invention, the method comprises heating the substrate to the respective temperatures by passing an electric current directly therethrough.

The idea upon which the invention of the instant application is based is that, in the production of polycrystalline silicon rods, a good silicon-halogen yield, on the one hand, and a good fine-crystalline surface of the silicon, on the other hand, is obtained. Normally, both are not simultaneously attainable i.e. a better yield results, at the same time, in a correspondingly poorer silicon surface.

Heretofore, a good surface i.e. a fine-crystalline surface, has been obtained only at the expense of the silicon-halogen yield and, in fact, either by decreasing the precipitation or deposition temperature or by increasing the silicon-halogen throughput or flow rate i.e. a high throughput or flow rate and/or a high mole ratio.

As indicated by the invention of the instant application, an improvement of the surface quality is achievable with respect to fine-crystalline structure, however, without considerably impairing the silicon yield, if a constant temperature is not employed during the entire precipitation or deposition period but, rather, in accordance with the invention of the instant application, the temperature at the beginning of the precipitation or deposition is held at very low values.

Other features which are considered as characteristic for the invention are set forth in the appended claims.

Although the invention is illustrated and described herein as embodied in method of deposition of silicon in fine crystalline form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying in which the single FIGURE is a sectional view, partly diagrammatic and partly schematic of a device for performing the method of deposition of silicon in fine crystalline form in accordance with the invention.

Referring now to the FIGURE of the drawing, there is shown therein a device for depositing or precipitating polycrystalline silicon, made up of a metallic base plate 1 and, seated thereon, a hood 2 formed, for example, of quartz. Gas-tight electrodes 4 which are electrically insulated from one another extend through the metallic base plate 1 and are connected to respective ends of a rod-shaped substrate bent into the shape of a U, and formed of highly pure silicon. A nozzle 5 extends through the metallic base plate into the interior of the reaction chamber defined by the hood 2 and serves to supply fresh gas; according to the illustrated embodiment, the nozzle 5 is surrounded concentrically by an exhaust tube 6 for spent reaction gas mixture. The rod-shaped substrate 3 is heated by a power supply 7.

A reservoir 11 for hydrogen is provided for heating the reaction gas. The hydrogen flowing from the tank 11 passes through a flowmeter 12 and through an evaporator 13 which is filled with liquid silicochloroform, the evaporator 13 having an outlet which leads to the supply nozzle 5 in the reaction vessel. To adjust the temperature in the evaporator 13, the latter is housed in a thermostat 14. The amount of silicochloroform entrained in the hydrogen gas i.e. the mole ratio between silicochloroform and hydrogen, can be adjusted thereby.

If an optimal temperature of 1100° C. of the silicon substrate rod, which considerably affects the intensity of the precipitation of deposition, is provided for the deposition process, the crystalline structure of the silicon can already be influenced materially even if a temperature of 1000° C. is used during the first two hours. In principle, it is even possible to lower the temperature to 900° C., the limit being set only by the necessity of attaining reliable silicon deposition or precipitation. In an apparatus having an optimal deposition or precipitation temperature of about 1100° C., a loss of deposited silicon of about 50% is already evident at 1000° C. and as much as 80% at 900° C.

It is an object of the invention to provide a method of deposition of silicon in fine crystalline form which is more easily performed than the previously proposed method of this general type, so that the method according to the invention is especially suited for mass production i.e. parallel operation of a large number of reactors for, especially thick rods of, for example, 5" diameter and more.

With the method according to the invention, it has been possible to reduce the size of the crystallites to about ⅓ as compared to the hereinaforementioned conventional method.

In devices wherein pairs of silicon substrates are used, the latter, as is generally known are connected at the ends thereof facing away from the supply electrodes by an electrically conducting jumper or bridge preferably formed of silicon. The connections between jumper or bridge and rod result in overheated points with all the adverse consequences thereof, which can no longer be eliminated even by the most varied temperature programs.

One great advantage of the method according to the invention of this application is that overheating of these connections is prevented by the reduced starting temperature, and uniform, round growth of the silicon is obtained, which is maintained during the further precipitation or deposition process.

There are claimed:

1. Method of deposition of silicon in fine crystalline form upon a silicon substrate which is directly heated by an electric current from a reaction gas of a silicon-halogen compound and hydrogen which comprises, at a set mole ratio of the reaction gas and throughput selected for the deposition process, setting the deposition rate-determining temperature of the substrate, at the beginning of deposition, at a temperature, above 900° C. but lower than 1050° C. for deposition of silicon thereon, maintaining said temperature during a first deposition phase, thereafter, raising the temperature of the substrate to about 1100° C. while maintaining the mole ratio of the reaction gas and the throughput, and maintaining said temperature for the remainder of the deposition to produce polycrystalline silicon rods.

2. Method according to claim 1 wherein the substrate temperature at the beginning of deposition is about 1000° C.

3. Method according to claim 1 wherein the time interval of the first deposition phase is at most two hours.

4. Method of deposition of silicon in fine crystalline form upon a silicon substrate which is directly heated by an electric current from a reaction gas of a silicon-halogen compound and hydrogen which comprises, at a set mole ratio of the reaction gas and throughput selected for the deposition process, setting the deposition rate-determining temperature of the substrate, at the beginning of deposition, at a temperature, above 900° C. but lower than 1050° C. for deposition of silicon thereon, maintaining said temperature during a first deposition phase, thereafter, raising the temperature of the substrate to about 1100° C. while maintaining the mole ratio of the reaction gas and increasing the throughput, and maintaining said temperature for the remainder of the deposition to produce polycrystalline silicon rods.

* * * * *